May 27, 1952      G. AUGEREAU      2,598,094

BEARING SEAL

Filed Oct. 28, 1946

Inventor

GASTON AUGEREAU

By A. D. Adams

Attorney

Patented May 27, 1952

2,598,094

UNITED STATES PATENT OFFICE 2,598,094

BEARING SEAL

Gaston Augereau, Paris, France, assignor to "Le Joint Francais," Bezons, France, a corporation of France Application October 28, 1946, Serial No. 706,202
In France October 29, 1945

10 Claims. (Cl. 286—11.16)

1

This invention relates to fluid seals and has more particular reference to lubricant seals for bearings.

One of the objects of the present invention is to provide a lubricant seal which includes a split annular diaphragm composed of resilient plastic material having sufficient elasticity to permit mounting to bear against the shaft in sealing relation and which includes novel means for supporting the diaphragm in position.

Another object of the present invention is to provide a seal, as characterized above, in which the diaphragm is readily removed and replaced without dismounting the bearing assembly.

Another object of the present invention is to provide a seal, as characterized above, including novel means for maintaining the diaphragm in oil-tight engagement with the shaft even after the bearing surfaces of the shaft have become worn.

A further object of the invention is to provide a sealing assembly which is simple in construction, economical in manufacture, readily installed and replaced, and is efficient in operation.

Other objects and advantages of the invention will be apparent in the specification when taken into consideration with the accompanying drawings, wherein.

Figure 1:
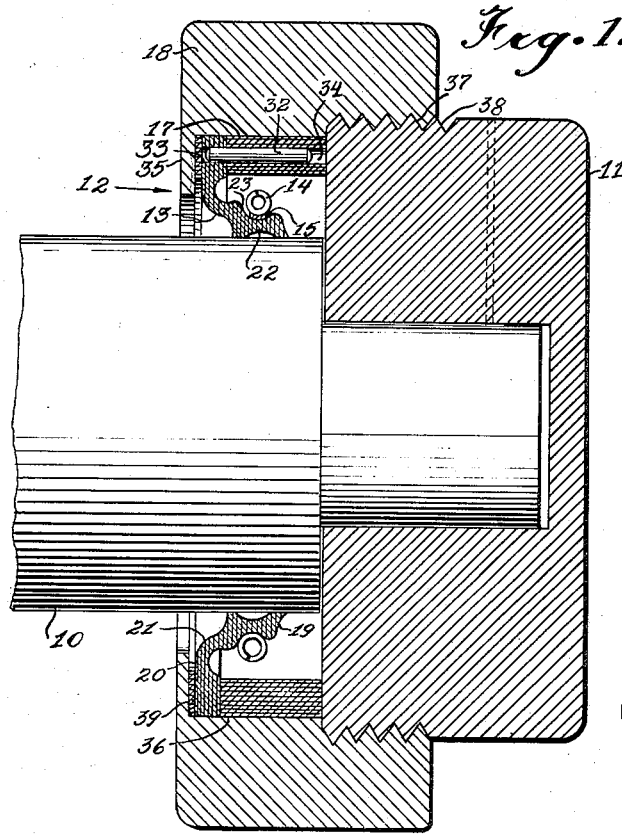
Fig. 1 is a vertical sectional view of a seal embodying the present invention mounted on a shaft adjacent to the inner side of an end bearing.

Referring to Fig. 1, there is shown a shaft 10, rotatably mounted in an end bearing 11 and having a seal 12 constructed in accordance with the present invention mounted to bear in sealing relation thereagainst adjacent to the inner side of the bearing.

The seal is shown as comprising a sealing assembly, including a split annular fitting or diaphragm 13, a garter spring 14, a pair of flexible coupling members 15, 16, a split cylindrical supporting member 17, and a cap or cover member 18 for holding the sealing assembly in place against the inner face of the bearing.

The annular diaphragm 13 is preferably made of a resilient plastic material, such as synthetic rubber or the like, characterized by having sufficient resistance to the lubricant to be contained and to the highest temperatures which may be reached in service, and of sufficient elasticity to permit it to be readily mounted to surround the shaft by spreading the split ends apart. The diaphragm is of the contour illustrated in cross section and, specifically, may be said to comprise a foot portion 19 connected to a leg portion 20 by means of a thin, curved web portion 21, the leg portion forming an integral, outwardly extending flange. The foot portion 19 has an annular groove or recess 22 formed in its inner surface and an annular groove or recess 23 formed in its outer surface. The diaphragm is split, as indicated at 24, to permit it to be readily mounted to surround the shaft by spreading the split ends apart. While the split may be oblique or zig zag, in the particular embodiment shown, it is radial to the shaft.

Figure 3:
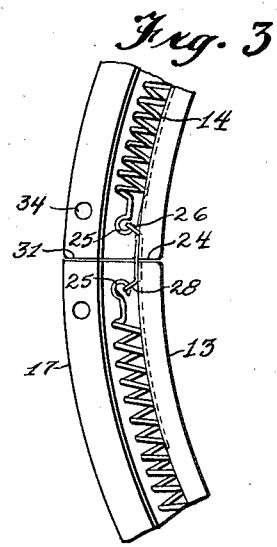
Fig. 3 is an enlarged fragmentary end view showing the manner in which the garter spring is mounted.
Figure 4:
Fig. 4 is a plan view of the closure means for connecting the ends of the garter spring.
Figure 2:
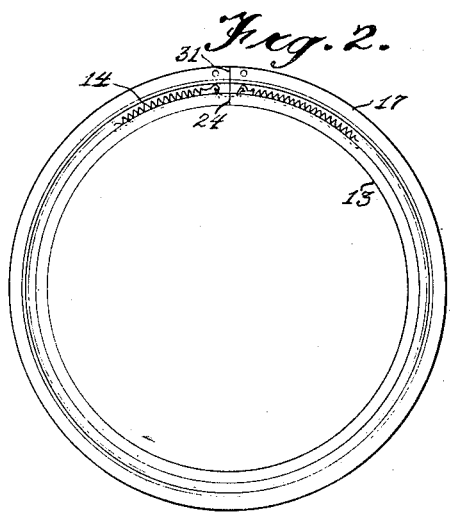
Fig. 2 is a right hand end view of the seal shown in Fig. 1, with the cap omitted.

The garter spring 14 is shown as being a coiled spiral spring having hooks 25 formed on the ends thereof. It is mounted in the groove 23 in the foot 19 of the diaphragm. Suitable means are provided for securing the spring on the diaphragm. In the particular embodiment shown, a pair of flexible strap members 15, 16 have one of their ends secured to the diaphragm 13 in the groove 23 at points spaced from the ends thereof. The strap 15 is shown as having an enlarged head 26 formed on its free end and provided with an opening 27 to permit the free end of the strap member 16 to be threaded therethrough. The strap member 16 also has a head 28 formed on its free end. Both of the heads 26 and 28 of the strap members are turned outwardly at their ends and provided with openings 29, 30, respectively, for receiving the hooks 25 on the ends of the garter spring. A plan view of the straps is shown in Fig. 4. When the sealing assembly is mounted to surround the shaft, the straps lie in the groove 23 beneath the garter spring, as shown in Figs. 1 and 3.

The length of the diaphragm is such as to completely encircle the shaft and the tension of the garter spring is such that the foot of the diaphragm is constricted about the shaft with the minimum pressure necessary for tightness to prevent the escape of the lubricant. The grooved foot portion permits the sealing surface to conform to any irregularities in the contour of the shaft. The tension of the spring acts through the flexible straps to hold the split ends of the diaphragm tightly together.

The split, cylindrical supporting member 17 is preferably also made of resilient plastic material having sufficient elasticity to permit it to be surrounding the shaft by spreading its split ends apart. The split 31 formed in the supporting member may be oblique or zig zag; but, in the embodiment illustrated, it is perpendicular to the shaft. It is positioned between the bearing and the upper end portion of the leg of the diaphragm, as shown in Fig. 1, and acts as a sealing gasket. It is secured to the leg or flange of the diaphragm by means of a pair of pins 32 extending through holes 33 in the diaphragm flange and into bores 34 formed in the supporting member, one located on each side of the split ends of the diaphragm and supporting member, as clearly shown in Figs. 1 and 3. The interface between the supporting member 17 and the leg 20 of sealing annular diaphragm 13 is an annular plane surface radial to and concentric with the axis of shaft 10 and the annular diaphragm 13.

The sealing assembly is blocked or secured on the bearing 11 by any appropriate means. In the embodiment illustrated, the securing means comprises a cap or cover member 18 having a flanged end 35 and a bore 36 which closely fits the outer surface of the diaphragm flange and the outer surface of the cylindrical supporting member, as shown in Fig. 1. The cap is shown as being threaded, as indicated at 37, to engage threads 38 on the bearing to permit longitudinal adjustment of the cap member with respect to the shaft and secure the sealing assembly in position on the shaft. If desired, a metallic washer 39 may be inserted between the flange of the cap member and the diaphragm-flange to prevent injury to the sealing assembly when the cap is tightened thereon.

Figure 5:
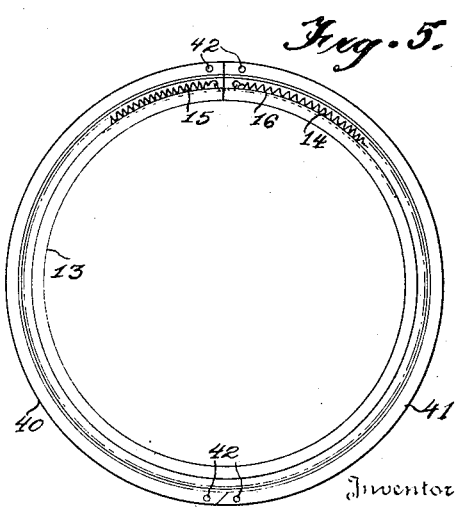
Fig. 5 is a view similar to that shown in Fig. 2, but showing a modification of the cylindrical supporting member.

In Fig. 5, there is shown a modification of the sealing assembly which is substantially identical to that shown in Figs. 1 to 4, with the exception that the cylindrical supporting member is made of metal and is made in two parts 40, 41. The two-part supporting member is mounted between the diaphragm flange and the bearing and the parts are secured to the diaphragm flange by means of pins 42, one located on each side of the abutting ends of the parts 40, 41. The pins 42 and the method of mounting them are similar to that shown in Fig. 1.

While the sealing device of the invention has been described and illustrated as applied to an end bearing, obviously, the device is applicable to intermediate and other types of bearings.

From the foregoing description, it will be seen that there has been provided a seal which is easily installed, performs its function efficiently, and provides for ready replacement of the parts when worn.

Obviously, the invention is not restricted to the modifications thereof, herein shown and described.

What is claimed is:

1. A sealing device for use in abutting relation with a member which is adapted to interiorly receive a rotatable shaft, comprising a split annular sealing element having a foot portion adapted to engage the shaft and an outwardly projecting leg portion, spring means mounted for constricting said foot portion about the shaft, a split annular supporting part adapted to be mounted surrounding the shaft and interposed between said member and said leg portion, means removably securing said supporting part to said leg portion, adjustable means for holding said supporting part in tight engagement with said member, said adjustable means comprising a flanged hollow cover piece adjustably mounted on said member and having its interior surface in tight engagement with the top of said leg portion and its outer surface of said annular supporting part, the foot portion having annular grooves in its top and bottom surfaces, and the spring means comprising a garter spring mounted in the groove on the top of the foot portion, and a pair of flexible coupling members mounted in said last named groove beneath said spring means and each of said coupling members having one of its ends secured to one end of the foot portion adjacent the split and extending circumferentially around the foot portion across the split of said annular sealing member and connected to an end of said spring, said coupling members being interlaced in their passage adjacent said split of said annular sealing element between the ends of said spring.

2. In a sealing device for use in abutting relation with a member which is adapted to interiorly receive a rotatable shaft, an annular flanged sealing element adapted to be mounted on a shaft in sealing bearing relation thereagainst, said sealing element being provided with a groove on a portion of its exterior surface opposite its surface adapted to bear against the shaft, an annular supporting part adapted to be mounted surrounding the shaft and in spaced relation therefrom and to be positioned between said flange of said sealing element and the member, locking means for locking said supporting part to said flange, said annular sealing element and said annular supporting part being elastic and being provided with a substantially radial split, a garter spring fitted in said groove of said sealing element and having two ends of which are respectively located on opposite sides of said split of said annular sealing element, and a pair of connecting means each of which connects one end of said spring on one side of said split of said sealing element to a point on said sealing element on the opposite side of the split thereof and each of which means passes across said split in said sealing element, said means being adapted to urge together the ends of said sealing element.

3. A sealing device according to claim 2, said annular sealing element having a foot portion adapted to bear against the shaft and further having an outwardly projecting leg portion connected to the foot portion by a thin curved web portion, and said sealing element and said supporting part being constituted of resilient plastic material.

4. In a sealing device for use in abutting relation with a member which is adapted to interiorly receive a rotatable shaft, an annular flanged sealing element adapted to be mounted on a shaft in sealing bearing relation thereagainst, said sealing element being provided with a groove on a portion of its exterior surface opposite its surface adapted to bear against the shaft, an annular supporting part adapted to be mounted surrounding the shaft and in spaced relation therefrom and to be positioned in engaging relation between said flange of said sealing element and the member, said annular sealing element being elastic and being provided with a substantially radial split, a garter spring fitted in said groove of said sealing element and having two ends which are respectively located on opposite sides of said split of said annular sealing member, and a pair of flexible strap members each having one of its ends attached to the respective ends of said spring and each traversing the split in said sealing element and each having its other end secured to a point on said sealing element.

5. A sealing device according to claim 4, said annular sealing element having a foot portion adapted to bear against the shaft and further having an outwardly projecting leg portion connected to the foot portion by a thin curved web portion, and said sealing element and said supporting part being constituted of resilient plastic material, each said strap member being secured to opposite ends of the foot portion of said sealing element adjacent to the split and extending in opposite directions from the respective points of attachment to said foot portion.

6. A sealing device according to claim 2, the engaging interface between said supporting part and said flange of said annular sealing element being an annular plane surface radial to and concentric with the axis of said annular sealing element.

7. A sealing device according to claim 4, said annular supporting member being elastic and being provided with a substantially radial split.

8. A sealing device according to claim 4, said annular supporting means being metallic and being made in two separate parts.

9. A sealing device according to claim 4, and locking means adapted and mounted for locking said supporting part to the flange of said sealing element.

10. A sealing device according to claim 4, the engaging interface between said supporting part and said flange of said annular sealing element being an annular plane surface radial to and concentric with the axis of said annular sealing element.

GASTON AUGEREAU.

REFERENCES CITED

The following references are of record in the file of this patent:

UNITED STATES PATENTS

| Number | Name | Date |
|---|---|---|
| 1,053,194 | Matters | Feb. 18, 1913 |
| 1,296,181 | Grigg | Mar. 4, 1919 |
| 1,822,722 | Bell | Sept. 8, 1931 |
| 1,855,897 | Taylor | Apr. 26, 1932 |
| 2,107,974 | Bechereau et al. | Feb. 8, 1938 |
| 2,161,003 | Berman | June 6, 1939 |
| 2,170,915 | Schweitzer | Aug. 29, 1939 |
| 2,316,713 | Procter | Apr. 13, 1943 |

FOREIGN PATENTS

| Number | Country | Date |
|---|---|---|
| 153,256 | Germany | of 1904 |
| 544,881 | Great Britain | of 1942 |